(12) United States Patent
Werner

(10) Patent No.: US 6,195,925 B1
(45) Date of Patent: Mar. 6, 2001

(54) SAFETY WARNING FLAG ASSEMBLY FOR USE WITH HIGHWAY TRUCKS

(76) Inventor: Clements M. Werner, 8101 W. Manitoba St., #10, West Allis, WI (US) 53219

(*) Notice: Subject to any disclaimer, the term of this patent is extended or adjusted under 35 U.S.C. 154(b) by 0 days.

(21) Appl. No.: 09/179,364

(22) Filed: Oct. 26, 1998

(51) Int. Cl.[7] .................................................. G09F 21/04
(52) U.S. Cl. .............................. 40/591; 40/218; 40/612; 116/173
(58) Field of Search .............................. 40/591, 590, 218, 40/588, 612, 217; 116/265, 173; 73/170.05; 296/21

(56) References Cited

U.S. PATENT DOCUMENTS

| | | | |
|---|---|---|---|
| 1,579,034 | * | 3/1926 | Roberts .............................. 73/170.05 |
| 1,685,080 | * | 9/1928 | Auchincloss ............................ 40/588 |
| 1,742,574 | * | 1/1930 | Breedlove .......................... 116/73 X |
| 2,101,163 | * | 12/1937 | Wolfe ................................... 116/173 |
| 2,243,618 | * | 5/1941 | Brown .......................... 73/170.05 X |
| 3,678,456 | * | 7/1972 | Gruber ............................... 40/591 X |
| 4,162,100 | * | 7/1979 | Muscillo ......................... 296/100.12 |
| 4,309,836 | * | 1/1982 | Knapp ............................... 40/612 X |
| 4,622,494 | * | 11/1986 | Johnson ............................ 40/591 X |
| 4,646,673 | * | 3/1987 | Fordyce ............................ 116/34 R |
| 4,958,436 | * | 9/1990 | Tusche ................................. 33/264 |
| 4,980,984 | * | 1/1991 | Kulp et al. ........................ 40/612 X |
| 4,999,938 | * | 3/1991 | Behling ............................. 40/612 X |
| 5,028,031 | * | 7/1991 | Stoudt ............................... 40/612 X |
| 5,152,091 | * | 10/1992 | Leach ................................ 40/612 X |
| 5,215,346 | * | 6/1993 | Reitzloff et al. ....................... 296/51 |
| 5,365,685 | * | 11/1994 | Shank ............................... 40/217 X |
| 5,450,058 | * | 9/1995 | Collier .............................. 40/591 X |
| 5,481,244 | * | 1/1996 | Dicke .............................. 116/173 X |
| 5,979,355 | * | 11/1999 | LeBlanc ........................... 116/173 X |
| 6,032,908 | * | 3/2000 | Hillstrom et al. ................. 40/607 X |

FOREIGN PATENT DOCUMENTS

1105660 * 7/1955 (FR) ...................................... 40/591

* cited by examiner

Primary Examiner—Terry Lee Melius
Assistant Examiner—James M Hewitt
(74) Attorney, Agent, or Firm—Joseph S. Heino

(57) ABSTRACT

A safety warning flag assembly for use with highway trucks provides for a foldable placard which is attachable to the front end of a highway truck. The placard, attached longitudinally along the front bumper is foldable along its longitudinal length. When closed, the placard essentially becomes part of the bumper. When opened, the placard displays a warning sign to oncoming traffic. With the placard in its open position, a flag receiving fixture attached to the placard allows a conically shaped flag and flag holder to be received within the fixture. In an alternative embodiment, the flag fixture is functionally adapted to receive the flag from various angles such that the flag can be flown at its most effective angle for warning traffic of the approaching wide load. In another alternative embodiment, the flag fixture may be attachable to other parts of the truck and may be used in conjunction with the warning placard.

5 Claims, 3 Drawing Sheets

SAFETY WARNING FLAG ASSEMBLY FOR USE WITH HIGHWAY TRUCKS

FIELD OF THE INVENTION

This invention relates generally to warning devices and assemblies for such devices. More particularly, it relates to a safety warning flag assembly which is intended to be affixed to or used in conjunction with a highway truck while it is moving wide loads. It also relates to a safety warning flag assembly which facilitates the warning of oncoming, side approaching or trailing traffic that such a wide load is in fact being moved or transported by the highway truck.

BACKGROUND OF THE INVENTION

The movement of large loads by highway trucks happens every day on roads all across the country. Such loads may take the form of large pieces of construction equipment being moved between construction sites. They may be large sections of pre-fabricated homes or concrete bridges. They may be large yachts or even utility company poles. In short, the kinds and types of items moved in this fashion is almost limitless. Indeed, the only real limitation is the size of the object being moved. Due to this size factor, it is necessary to take special precautions when moving such large objects such as properly fastening the load to the trailer bed. And special attention on the part of the driver of the truck must be taken at all times.

In the experience of this inventor, as a motorist and as one who sees the benefit of a better way of doing things, it is apparent that the movement of large objects over our roads and freeways requires not only the special attention on the part of the truck driver and his supporting crew, but also special attention on the part of all other motorists who may come in contact with such a truck and its load. But such special attention is not always given to such dangerous endeavors. Indeed, accidents and injuries to person and property can and do occur in the absence of special precautions. Law enforcement agencies and insurance underwriters alike are acutely aware of such incidents. And the fact that such incidents can and do result in claims against the trucking industry and their insurance carriers has made them equally aware of the need to move large objects as safely as reasonably possible. The movement of such objects while relying only upon an old broomstick and a greasy red rag to notify others of impending danger can no longer be tolerated.

SUMMARY OF THE INVENTION

It is, therefore, a principal object of this invention to provide a new, useful and uncomplicated safety warning flag assembly which can be permanently affixed to or used with a highway truck and which is readily usable for those occasions when it is moving wide loads. It is another object of this invention to provide such an assembly which requires only a minimal number of elements and which requires only a minimal number of steps to utilize.

The present invention has obtained these objects. It provides for a foldable placard which is attachable to the front end of a highway truck. In the preferred embodiment, the foldable placard is attached to the truck's front bumper in such a way so as not to interfere with engine air flow or with headlights, turn signal lights or running lights. The placard, attached longitudinally along the front bumper is foldable along its longitudinal length. When closed, the placard essentially becomes part of the bumper. When opened, the placard displays a warning sign to oncoming traffic.

With the placard in its open position, a flag receiving fixture attached to the placard allows a conically shaped flag and flag holder to be received within the fixture. In an alternative embodiment, the flag fixture is functionally adapted to receive the flag from various angles such that the flag can be flown at its most effective angle for warning traffic of the approaching wide load. In another alternative embodiment, the flag fixture may be attachable to other parts of the truck and, in this fashion, may be used in conjunction with the warning placard. The foregoing and other features of the assembly of the present invention will be further apparent from the description which follows.

DETAILED DESCRIPTION

Figure 1:
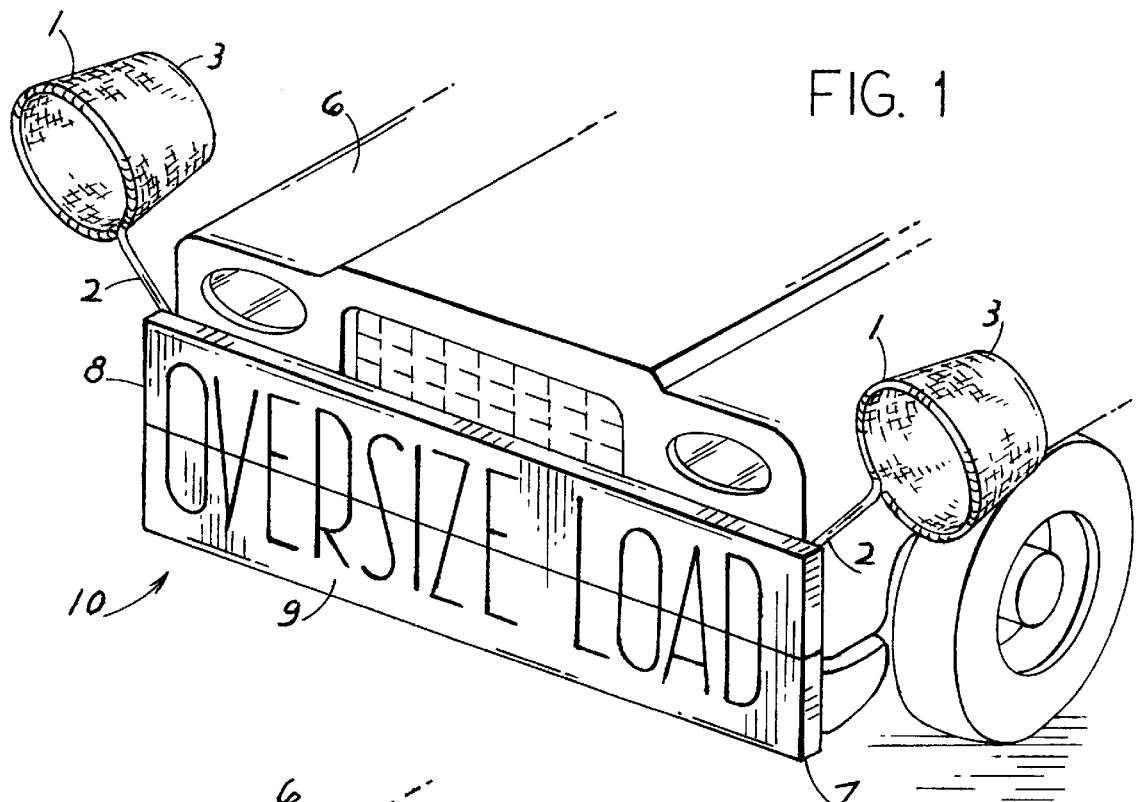
FIG. 1 is a front perspective view of the front end of a truck utilizing the assembly of the present invention and showing the warning placard in the open position.

Referring now to the drawings in detail, FIG. 1 shows a safety warning flag assembly, generally identified 10. The flag assembly 10 is attached to the front end of a truck 6. In particular, a foldable warning placard 7 is attached to the front bumper of the truck 6. Attachment of the placard 7 to the bumper 6 may be accomplished by any suitably secure method. For example, the use of conventional nuts and bolts (not shown) would be a perfectly acceptable fastening choice. As shown in FIG. 1, the placard 7 is in its normally "open" position. Attached to the backside of the warning placard 7 are two conically shaped flags 3. In the preferred embodiment, these flags 3 are made of a highly visible blaze orange or fluorescent orange or red colored material. The flags 3 are configured such that they fully deploy and become "inflated" by air flowing through them when the truck 6 is in motion. The conical design or configuration of each flag 3 concentrates the incoming flow of air into the smaller diameter opening at the rear of the flag 3. The front, rear and side profile of each such flag 3 in this fully deployed condition, combined with the aforementioned color scheme, makes each flag 3 highly visible from the perspective of oncoming, trailing or side traffic, respectively, relative to the truck 6. Each flag 3 has a flag pole 2 which extends the flag 3 well beyond the sides of the truck 6 and a flag ring 1 to which, and about which, the leading edge of the flag 3 is affixed. See FIG. 1. Upon closer inspection, it will be noted that the warning placard 7 is actually comprised of two separate sections. See FIG. 2.

Figure 2:
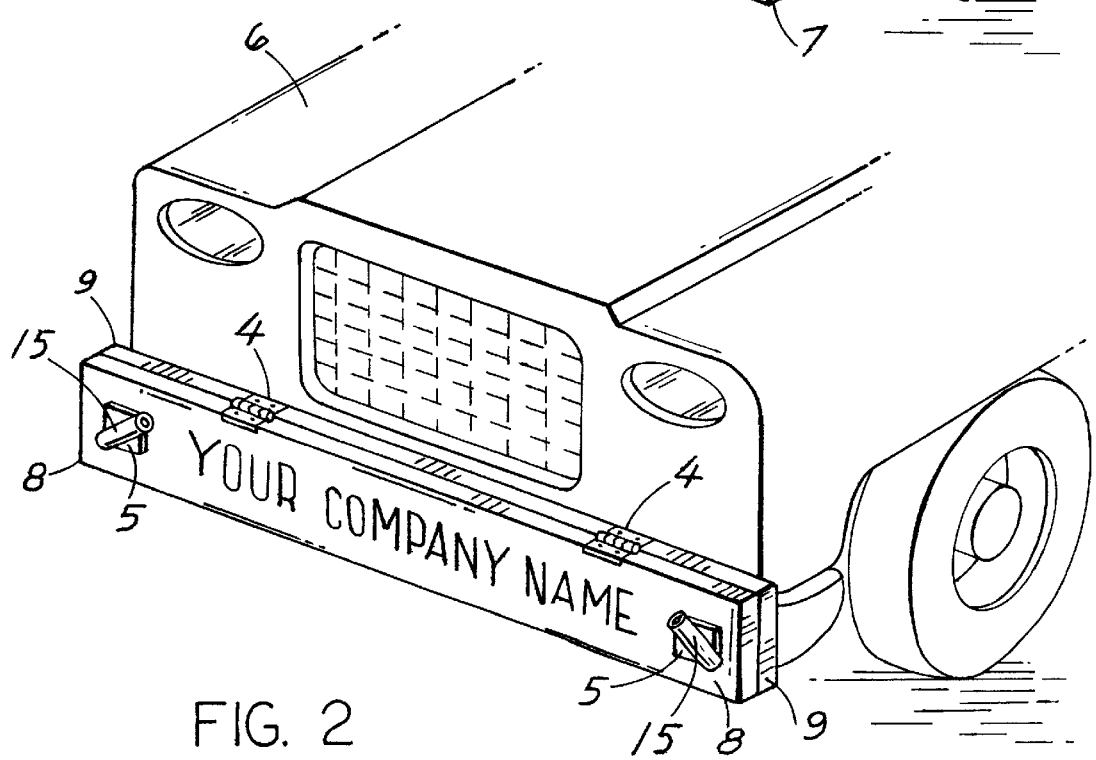
FIG. 2 is the same as FIG. 1 but showing the warning placard in the closed position.

The warning placard 7 includes an upper placard section 8 and a lowr placard section 9. The upper placard section 8 could also be referred to as the "first" placard section and the lower placard section 9 could be referred to as the "second" placard section. It is the lower placard section 9, or the "second" placard section, which is fastened directly to the front bumper of the truck 6 as previously described. 8 and a lower placard section 9. As shown in FIG. 2, the placard 7 is in its fully "closed" position. Each placard section 8, 9 extends parallel and in longitudinal arrangement with the other. In this fashion, the placard sections 8, 9 are rotatably fastened to each other by a pair of hinges 4. As shown in FIG. 2, a pair of flag fixtures 5 is attached to the forward facing side of the upper placard section 8 when the placard 7 is in its normally closed position. Each flag fixture 5 includes a flag post receiving cylinder 15 which is functionally adapted to receive the flag post 2 within it.

Figure 3:
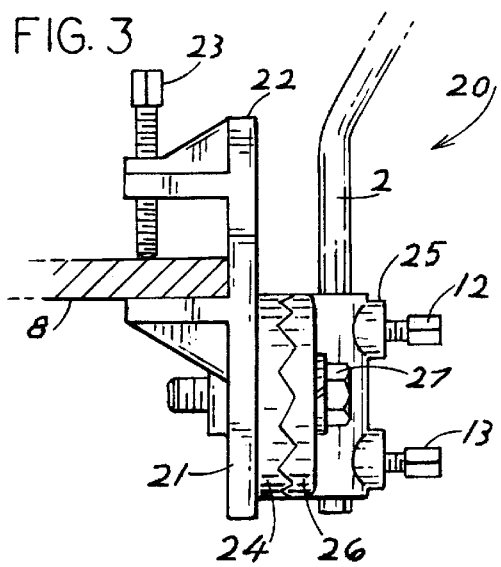
FIG. 3 is a front view of one embodiment of a flag receiving fixture for use in the assembly of the present invention.
Figure 4:
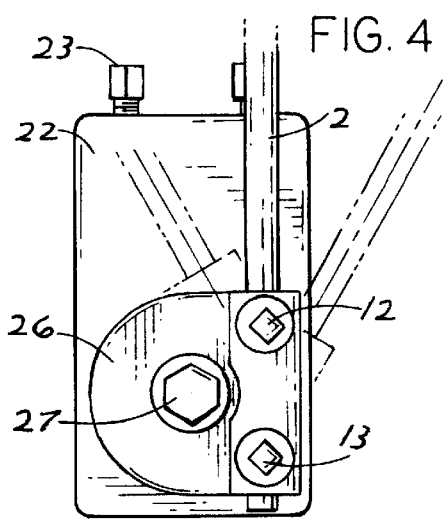
FIG. 4 is a side elevational view of the flag receiving fixture shown in FIG. 3.

In one alternative embodiment, the flag fixture 5 is replaced with an alternative flag fixture, generally identified 20. See FIGS. 3 and 4. In this preferred embodiment, the flag fixture 20 is removably attached to the upper placard portion 8. This is accomplished because the flag fixture 20 includes a support base 21 having a support arm 22 through which a fastening screw 23 is threaded. A radially splined portion 24 of the support base 21 is engageable with the radially splined portion 26 of a holder member 25. The holder member 25 is thus rotatable about a fastener 27 and is fixable in 360° about the support base 25. The flag post 2 is receivable within the holder member 25 and is fastenable within the holder 25 by means of a pair of set screws 12, 13.

Figure 5:
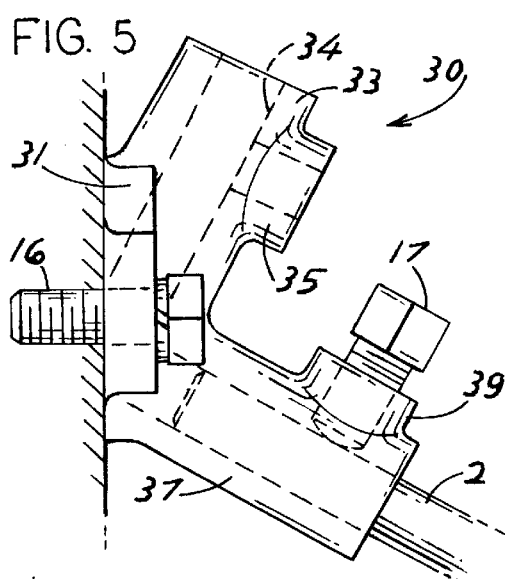
FIG. 5 is a front view of a second embodiment of a flag receiving fixture for use in the assembly of the present invention.
Figure 6:
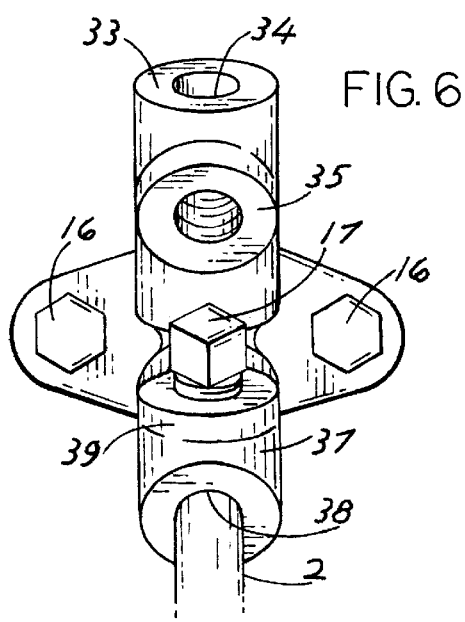
FIG. 6 is a side elevational view of the flag receiving fixture shown in FIG. 5.

In a second embodiment, the flag fixtures 5, 20 are replaced with another flag holding fixture, generally identified 30. See FIGS. 5 and 6. In this preferred embodiment, the flag fixture 30 is removably attached to a portion of the truck 6. Placement of the fixture 30 can be relatively low or high on the truck 6 because of the configuration of the fixture 30 which will become apparent. The flag fixture 30 includes a fixture base 31 which is fastenable to the side of the truck 6 by means of a pair of bolts 16 or other suitable fasteners. Extending outwardly from the base 31 is a first flag holder portion 33 and a second flag holder portion 37. The first flag holder portion 33 included a flag post receiving opening 34 and a set screw receiver 35. As was true with the previous embodiment, a set screw 17 is used to hold the flag post 2 in place. Likewise with the second flag holder portion 37, it includes a flag post receiving opening 38 and a set screw receiver 39. In this alternative embodiment, placement of the fixture 30 can be high on the side of the truck 6 and the flag 3, inserted within the second flag holder portion 37, faces generally downwardly. On the other hand, placement of the fixture 30 can be low on the side of the truck 6 and the flag 3, inserted within the first flag holder portion 34, faces generally upwardly.

Figures 7, 8:
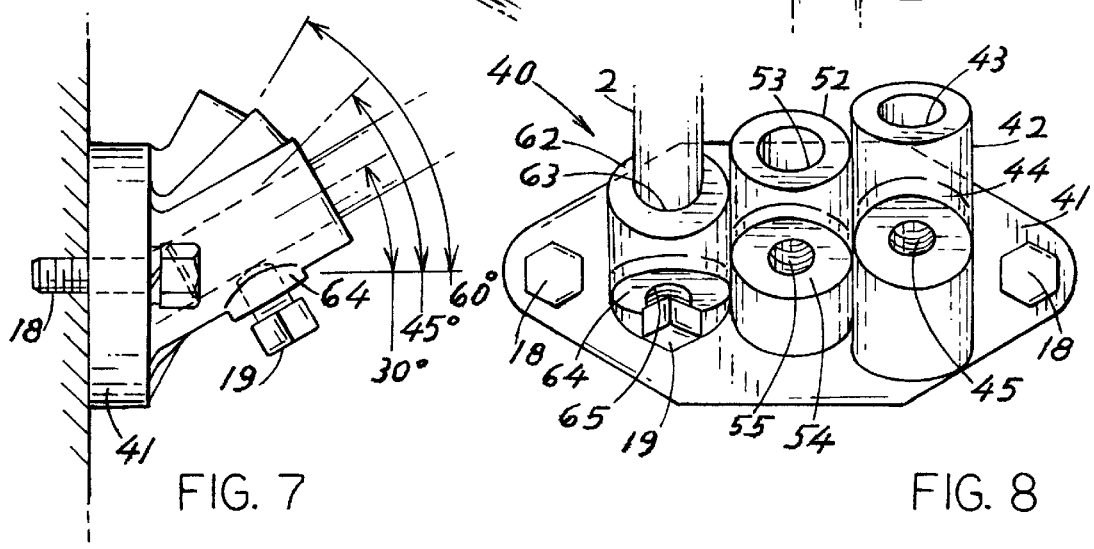
FIG. 7 is a front view of a third embodiment of a flag receiving fixture for use in the assembly of the present invention.
FIG. 8 is a side elevational view of the flag receiving fixture shown in FIG. 7.
Figure 10:
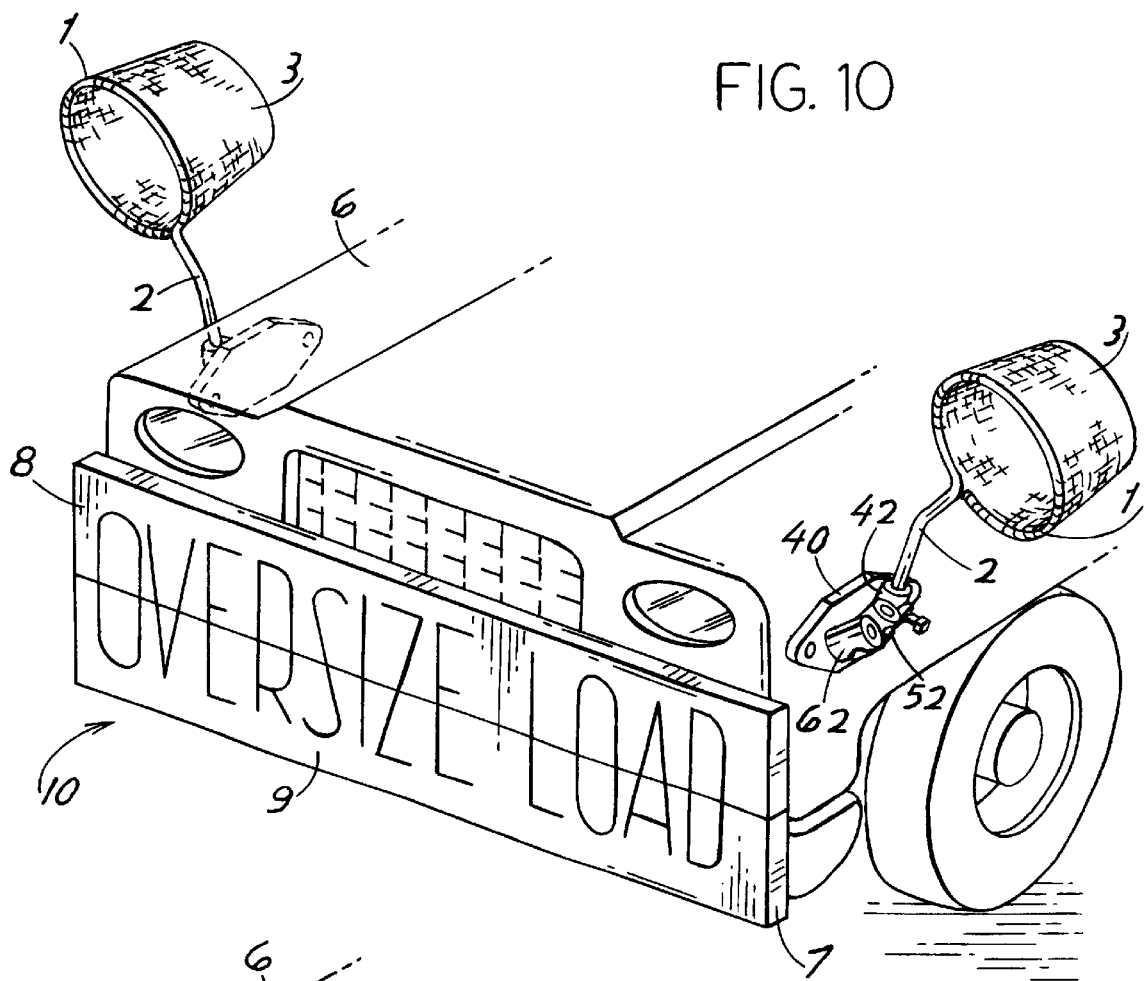
FIG. 10 is the same as FIG. 9 but showing the warning placard in the open position.
Figure 9:
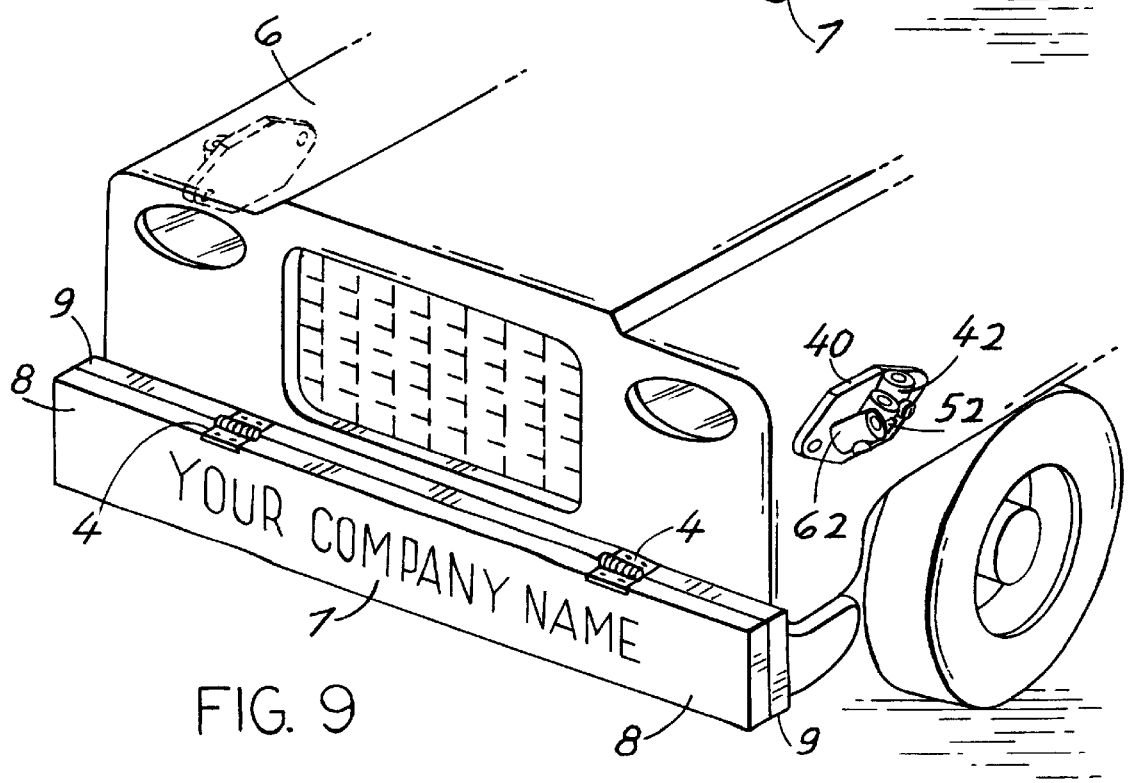
FIG. 9 is a front perspective view of the fronnt end of a truck utilizing the flag receiving fixture shown in FIGS. 7 and 8 and showing the warninng placard in the closed position.

In yet a third embodiment, the flag fixtures 5, 20, 30 are replaced with another flag holding fixture, generally identified 40. See FIGS. 7 and 8. In this preferred embodiment, the flag fixture 40, as was the case with the most previous alternative embodiment, is removably attached to a portion of the truck 6. Placement of the fixture 40 can be relatively low or high on the truck 6 because of the configuration of the fixture 40. The flag fixture 40 includes a fixture base 41 which is fastenable to the side of the truck 6 by means of a pair of bolts 18 or other suitable fasteners. Extending outwardly at various angles from the base 41 is a first flag holder portion 42, a second flag holder portion 52, and a third flag holder portion 62. In this alternative embodiment, the angles of presentation relative to the horizontal of the first, second and third flag holder portions 42, 52, 62 is 60°, 45° and 30°, respectively. The first flag holder portion 42 includes a flag post receiving opening 43, a set screw receiver 44, and a threaded set screw opening 45. As was true with the previous embodiment, a set screw 19 is used to hold the flag post 2 in place. Similarly, the second and third flag holder portions 52, 62 include a flag post receiving opening 53, 63, a set screw receiver 54, 64, and a threaded set screw opening 55, 65, respectively. In this alternative embodiment, placement of the fixture 40 can be low on the side of the truck 6 and the flag 3, inserted within any one of the three flag holder portions 42, 52, 62, faces generally upwardly at different angles depending upon what is desired or required by the user.

In application, the user of the truck 6 to which the assembly is attached opens the placard 7 by lifting the upper placard section 8. This allows a warning such as "OVERSIZE LOAD" to be prominently displayed to oncoming traffic. With the placard 7 in the open position, the flag posts 2 are inserted into the flag holder portions 15 of the flag fixtures 5. The truck is ready to proceed down the highway and, when it does, air flows through the flags 3 such that each is deployed and inflated to sufficiently warn all surrounding traffic that a large load is being moved by the truck. Alternatively, the user may utilize the alternative embodiments of the fixtures 20, 30, 40 to the same end.

From the foregoing detailed description of the illustrative embodiment of the invention set forth herein, it will be apparent that there has been provided a new, useful and uncomplicated safety warning flag assembly which can be permanently affixed to or used with a highway truck; which is readily usable for those occasions when it is moving wide loads; which requires only a minimal number of elements and which requires only a minimal number of steps to utilize.

The principles of this invention having been fully explained in connection with the foregoing, I hereby claim as my invention:

1. A safety warning flag assembly which comprises
a highway truck having a front end and sides extending rearwardly of said front end,
a rigid warning placard, said warning placard including a first longitudinally extending placard section and a second longitudinally extending placard section, both sections extending along the front end of said highway truck and each section having a common longitudinal edge with the other, said placard sections being hingedly attached to one another along their common longitudinal edges whereby the first placard section may be hingedly rotated about its longitudinal edge to overlay said second placard section in a layered or placard "closed" position,
means for attaching said second placard section to the front end of said highway truck whereby said warning placard is visible to oncoming traffic when said first and second placard sections are placed in a coplanar or placard "open" position,
a plurality of warning flags, each of said warning flags comprising a conical flag made of a highly visible color and including an annular flag support and a longitudinally extending flag support arm, means for removably attaching said longitudinally extending flag support arms to said truck, said flag support arm attaching means including at least one flag holding fixture attached to said truck, said at least one flag holding fixture being functionally adapted to removably receive at least one flag support arm therewithin, to extend the flag support arms and said conical flags outwardly beyond the sides of the highway truck whereby the conical flags are made highly visible to oncoming, side approaching and trailing traffic in relation to said highway truck.

2. The safety warning flag assembly of claim 1 wherein each of said at least one flag holding fixture includes means for varying the position at which the flag support arms present relative to the truck.

3. The safety warning flag assembly of claim 2 wherein each of said flag holding fixtures includes means for presenting the flag support arms at 30°, 45° and 60° relative to the horizontal.

4. The safety warning flag assembly of claim 3 wherein said warning placard bears a written warning when said first and second placard sections are placed in the coplanar or placard "open" position.

5. A safety warning flag assembly, which composes a highway truck having a front end and sides extending rearwardly of said front end, a plurality of warning flags, each of said warning flags comprising a conical flag made of a highly visible color and including an annular flag support and a longitudinally extending flag support arm, means for removably attaching said longitudinally extending flag support arms to said truck, said flag support arm attaching means including at least one flag holding fixture attached to said truck, said at least one flag holding fixture being functionally adapted to removably receive at least one flag support arm therewith in and to extend the flag support arms and said conical flags outwardly beyond the sides of the highway truck, and further including means for varying the position at which the flag support arms present relative to the truck, each of said at least one flag holding fixture including means for presenting the flag support arms at 30°, 45° and 60° relative to the horizontal, whereby said conical flags are made highly visible to oncoming, side approaching and trailing traffic in relation to said highway truck.

* * * * *